(12) United States Patent
Mateo et al.

(10) Patent No.: US 9,071,356 B2
(45) Date of Patent: Jun. 30, 2015

(54) METHOD FOR THE COMPENSATION OF NONLINEAR IMPAIRMENTS IN DISPERSION-MANAGED OPTICAL FIBER LINKS USING PHASE CONJUGATION AND EQUIVALENT OPTICAL LINK

(71) Applicant: NEC Laboratories America, Inc., Princeton, NJ (US)

(72) Inventors: Eduardo Mateo, Tokyo (JP); Yoshiaki Aono, Tokyo (JP)

(73) Assignee: NEC Laboratories America, Inc., Princeton, NJ (US)

( * ) Notice: Subject to any disclaimer, the term of this patent is extended or adjusted under 35 U.S.C. 154(b) by 97 days.

(21) Appl. No.: 13/628,460

(22) Filed: Sep. 27, 2012

(65) Prior Publication Data

US 2013/0077963 A1    Mar. 28, 2013

Related U.S. Application Data

(60) Provisional application No. 61/539,531, filed on Sep. 27, 2011.

(51) Int. Cl.
*H04B 10/08* (2006.01)
*H04B 10/2543* (2013.01)
*H04B 10/2531* (2013.01)

(52) U.S. Cl.
CPC ........ *H04B 10/2543* (2013.01); *H04B 10/2531* (2013.01)

(58) Field of Classification Search
CPC ........... H04B 10/2531; H04B 10/2543; H04B 10/255; H04B 10/2513; H04B 10/2507; G02B 6/29377; G02F 1/3538
See application file for complete search history.

(56) References Cited

U.S. PATENT DOCUMENTS

2006/0051039 A1*   3/2006   Wei ............................... 385/123

* cited by examiner

*Primary Examiner* — Ken Vanderpuye
*Assistant Examiner* — David Lambert
(74) *Attorney, Agent, or Firm* — Joseph Kolodka

(57) ABSTRACT

A method for nonlinearity compensation for an optical transmission link includes determining a dispersion effect of a transmission link; applying a phase conjugation to the transmission link, the phase conjugation responsive to an input wave over the transmission link and providing a conjugated version of the input wave; and configuring an optimum equivalent link responsive to the phase conjugation after the transmission link to compensate for a non-linear dispersion effect from said transmission link.

5 Claims, 2 Drawing Sheets

METHOD FOR THE COMPENSATION OF NONLINEAR IMPAIRMENTS IN DISPERSION-MANAGED OPTICAL FIBER LINKS USING PHASE CONJUGATION AND EQUIVALENT OPTICAL LINK

RELATED APPLICATION INFORMATION

This application claims priority to provisional application No. 61/539,531 filed Sep. 27, 2011, the contents thereof are incorporated herein by reference

BACKGROUND OF THE INVENTION

The present invention relates generally to optical communications, and more particularly, to a method for compensation of nonlinear impairments in dispersion-managed optical fiber links using phase conjugation and equivalent optical link.

In order to increase the fiber capacity two things have to be done: 1) Increase modulation order and 2) Reduce channel spacing on WDM systems. For 1, high optical-to-signal-noise-ratio OSNR is required, which translates into high optical power per channel. High power means high nonlinearity, which distorts the optical signal. This is called intra-channel nonlinear distortion. For 2, reducing channel spacing yields to increased nonlinear cross-talk between wavelength-division multiplexing WDM channels. This is called inter-channel nonlinear distortion.

From the above, fiber capacity is limited by the action of fiber nonlinearities. This invention proposes a method to compensate the nonlinear distortion, both intra- and inter-channel. Nonlinearity compensation allows increase either transmission capacity (for a give transmission distance) or transmission distance (for a given transmission capacity).

A number of techniques have been used to mitigate and compensate fiber nonlinearity. In particular, two are Mid-span Optical phase conjugation and Digital Backward Propagation (hereafter BP).

Mid-Span Optical Phase Conjugation

This method consists of performing optical phase conjugation in the middle of the transmission link. If the link has certain symmetry properties, the second half of the link compensates the nonlinear distortion created in the first half. Optical phase conjugation can be implemented in the optical domain or in the electrical domain. This technique presents the following limitations:
  i) Typical transmission link are non-symmetric
  ii) Implementation of optical phase conjugation requires cumbersome optical set-up with nonlinear optics involved.

Digital Backward Propagation (or Back-Propagation) (Hereafter BP).

This technique compensates fiber impairments (including nonlinearity) in the digital domain. This technique involves the following steps:
  a. Coherent detection of the optical signal: This step allows to recover both amplitude and phase.
  b. Analog-to-digital conversion: This step creates a digital version of the detected signal.
  c. Signal reconstruction: This step creates a digital version of the optical field at the end of the fiber.
  d. Back-propagation: This step takes the signal in c. and simulates optical propagation with negative parameters (i.e. backwards). This step involves:
    d.1. Knowledge of the fiber characteristics, namely: Dispersion parameter(s), nonlinear coefficient, distance (s) between amplifiers, gain of the amplifiers, fiber loss, input power.
    d.2. Solve the BP-equations with the above parameters. This is typically done using the so-called split step method. This method consists on dividing the transmission in multiple steps. The amount of steps depends on how fast the optical field changes along the link.

Accordingly, there is a need for an improved method for compensation of nonlinear impairments in dispersion-managed optical fiber links.

BRIEF SUMMARY OF THE INVENTION

The present invention is directed a method for nonlinearity compensation for an optical transmission link that includes determining a dispersion effect of a transmission link; applying a phase conjugation to the transmission link, the phase conjugation responsive to an input wave over the transmission link and providing a conjugated version of the input wave; and configuring an optimum equivalent link responsive to the phase conjugation after the transmission link to compensate for a non-linear dispersion effect from said transmission link.

These and other advantages of the invention will be apparent to those of ordinary skill in the art by reference to the following detailed description and the accompanying drawings.

DETAILED DESCRIPTION

The present invention is directed to a method for compensating for nonlinearity using phase conjugation in conventional dispersion managed, EDFA amplified optic link. The inventive method is a flexible implementation of optical phase conjugation. By a novel configuration of an equivalent optical link, nonlinearity compensation can be achieved with conventional EDFA amplification. Typically, for phase conjugation to be able to compensate for nonlinearity, the phase conjugator has to be located in the middle of a power and dispersion symmetric link. This configuration is very unpractical because it requires symmetric evolution of optical power before and after the phase conjugator. Since typical transmission systems use erbium-doped fiber amplifiers EDFA, this power symmetry is not achieved and phase conjugation is not effective. However, applicants have found that effective nonlinearity compensation can be achieved in dispersion managed links with conventional EDFA amplification. To do so, an equivalent optical link has to be used after the phase conjugator. This invention deals with the design of such equivalent link depending on the characteristics of the existing (transmission) link.

Figure 1:
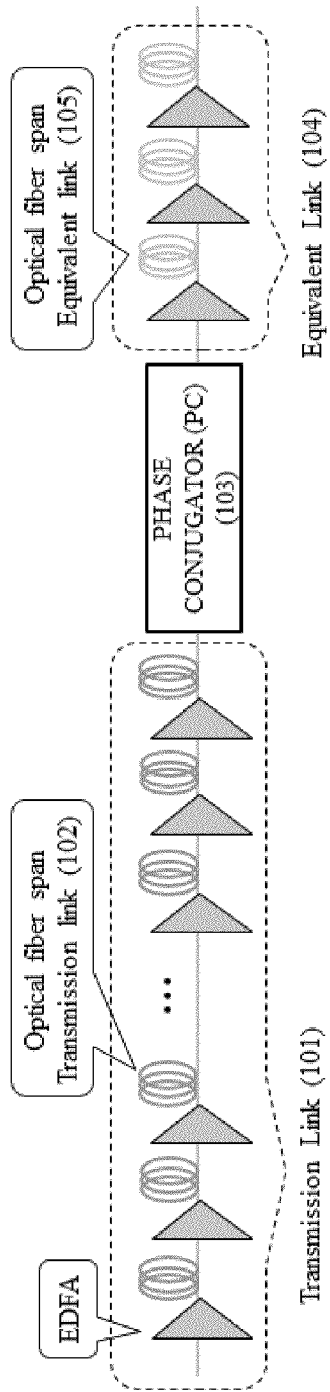
FIG. 1 shows an exemplary non-linearity compensation using a phase conjugator and an equivalent link with EDFAs and optical fibers, in accordance with the invention.

Referring now to FIG. 1, there is shown an exemplary nonlinearity compensation using a phase conjugator an equivalent link, in accordance with the invention. A Transmission link 101 with EDFAs and optical fibers over an optical fiber span 102 of the transmission link is coupled to a Phase Conjugator (PC) 103. The phase conjugator takes the input wave and gives the conjugated version. It can be implemented in a channel-by-channel basis or in a whole band basis. It can be implemented either in the optical domain or the opto-electronic domain. An equivalent link 104, for compensating for the nonlinear effects of the transmission link, is configured in response to the phase conjugator 103. The equivalent link 104 with EDFAs and optical fibers ($N_1$ spans) consists of an optical fiber span of the equivalent link (N2 spans) 105.

The inventive method is direct a method for an optimum configuration of the equivalent link 104 in order to compensate for the nonlinear effects of the transmission link 101.

Figure 2:
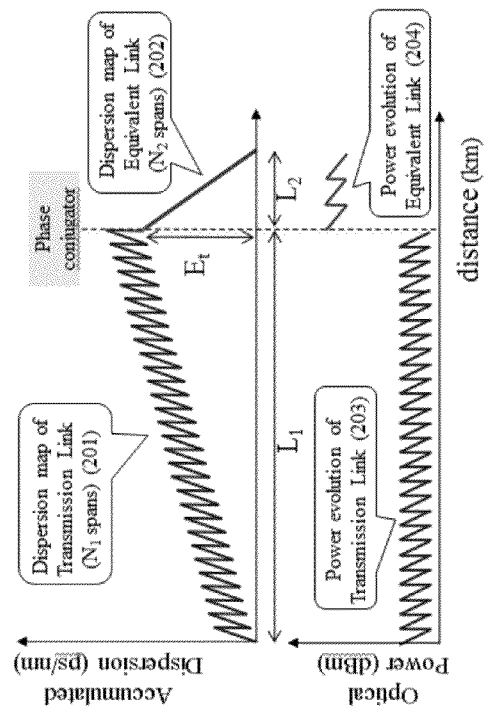
FIG. 2 shows characteristics and definitions of the transmission and equivalent link, before and after use of phase conjugation in accordance with the invention.

Referring to FIG. 2, there are shown characteristics and definitions of the transmission and equivalent link, i.e., before and after the phase conjugator in accordance with the invention. The diagram of FIG. 3 illustrates the principle of phase conjugation underlying the inventive method.

A Dispersion map 201 of the transmission with average dispersion of $D_{av(1)}$, where $D_{av(1)} = E_t/L_1$ is shown. $E_t$ is the total dispersion up to the phase conjugator PC and $L_1$ is the total length of the transmission link. The spans can have different lengths and different attenuations and different input powers. The dispersion map 202 of the equivalent Link with average dispersion $D_{av(2)} = E_t/L_2$ is also shown. $L_2$ is total distance of the equivalent link. The power evolution of the transmission link, $P_1(z)$ 203 and power evolution of the equivalent link, $P_2(z)$ are also shown.

Figure 3:
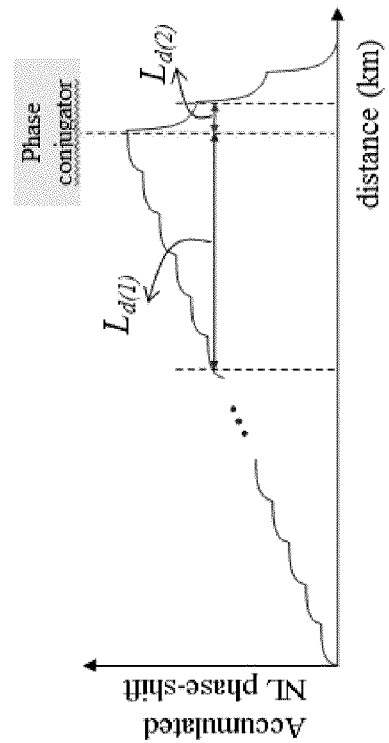
FIG. 3 illustrates the principle of operation of the inventive method.

The diagram of FIG. 3 shows the accumulated nonlinear phase shift before and after the electronic phase conjugation EPC. Since phase conjugation inverts the phase, the accumulated non-linear NL phase-shift decreases after EPC. To compensate for nonlinearity, the accumulated NL phase-shift within the respective dispersion lengths $L_{d(1)}$ and $L_{d(2)}$ has to be equal or close to equal.

The inventive method enables configuring the optimum equivalent link to be installed after the phase conjugator to compensate for the nonlinear effects of the transmission link.

The master equation where the design of the Equivalent link is the following equation where F is the equivalence factor:

$$\Gamma = \int_0^{Ld(1)} \exp[i\gamma_1(z)P_1(z)z]dz - \int_0^{Ld(2)} \exp[i\gamma_2(z)P_2(z)z]dz$$

Where:
$L_{d(1)}$ is the dispersion length of the transmission link
$L_{d(2)}$ is the dispersion length of the equivalent link
$\gamma_1$ is the nonlinear parameter of transmission link
$\gamma_2$ is the nonlinear parameter of equivalent link
$P_1(z)$ is the power evolution of transmission link ($P_{10}$ is the input power)
$P_2(z)$ is the power evolution of equivalent link ($P_{20}$ is the input power)

Since $L_{d(1)}$ and $\gamma_1$ are given, we find the optimum $P_2(z)$, $\gamma_2$ and $L_{d(2)}$ so $\Gamma$ is minimized. Fine tuning of the parameters can be achieved through simulation to maximize transmission performance.

Figure 4:
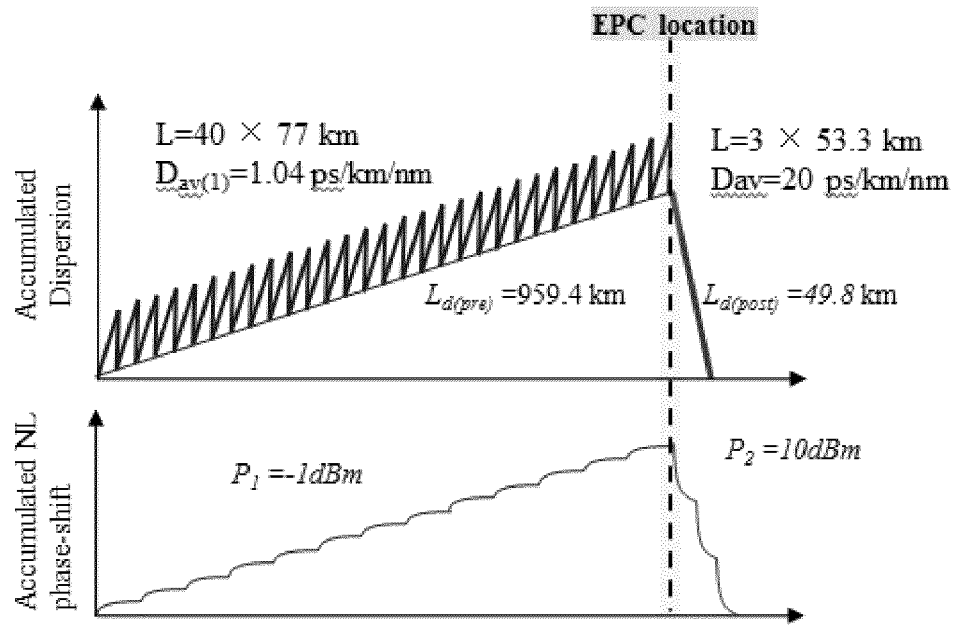
FIG. 4 shows an example of use of the inventive method.
Figure 4:
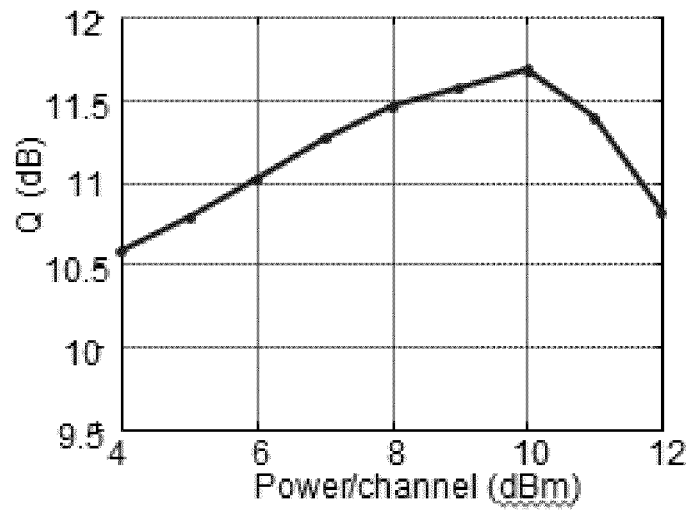

An example of use of the inventive method is shown in FIG. 4. A transmission link of 40 spans of 77 km/span includes an average dispersion $D_{av(1)} = 1.04$ ps/km/nm. The input power per channel is $P_{10} = -1$ dBm. Under the inventive method, the optimum equivalent link quickly becomes 3 spans of 53.3 km/span with an average dispersion of $D_{av(2)} = 20$ ps/km/nm and an input power per channel of $P_{20} = 10$ dBm. The equivalence factor F=0.01. At the point of the electronic phase conjugation EPC location, the equivalent link has a dispersion length of 49.8 km, compared to a transmission dispersion length of 959.4 km. The accumulated non-linear phase shift in the transmission link is brought down to zero by the equivalent link.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for nonlinearity compensation for an optical transmission link comprising the steps of:
    determining a dispersion effect of a transmission link;
    applying a phase conjugation to the transmission link, said phase conjugation responsive to an input wave over said transmission link and providing a conjugated version of said input wave; and
    configuring an optimum equivalent link responsive to said phase conjugation after said transmission link to compensate for a non-linear dispersion effect from said transmission link; wherein said equivalent link comprises a configuration responsive to $$\Gamma = \int_0^{Ld(1)} \exp[i\gamma_1(z)P_1(z)z]dz - \int_0^{Ld(2)} \exp[i\gamma_2(z)P_2(z)z]dz$$

where $\Gamma$ denotes an equivalence factor, $L_{d(1)}$ denotes a dispersion length of said transmission link, $L_{d(2)}$ denotes a dispersion length of said equivalent link, $\gamma_1$ denotes a nonlinear parameter of said transmission link; $\gamma_2$ denotes a nonlinear parameter of said equivalent link, $P_1(z)$ denotes a power evolution of said transmission link, and $P_2(z)$ denotes a power evolution of said equivalent link.

2. The method of claim 1, wherein said equivalent link provides an accumulated non-linear phase shift that counteracts a non-linear phase from said transmission link.

3. The method of claim 1, wherein $L_{d(1)}$ and $\gamma_1$ are given, and an optimum $P_2(z)$, $\gamma_2$ and $L_{d(2)}$ is determined so $\Gamma$ is minimized.

4. The method of claim 1, wherein fine-tuning of parameters of said equivalence factor is determined through simulation to maximize transmission performance over said transmission link.

5. The method of claim 1, wherein said equivalent link is configured with erbium-doped fiber amplification EDFA.

* * * * *